US012805454B2

(12) United States Patent
Kunz et al.

(10) Patent No.: US 12,805,454 B2
(45) Date of Patent: Nov. 24, 2026

(54) PHYTOPHOTONIC APPROACH TO ENHANCED PHOTOSYNTHESIS

(71) Applicants: The Board of Trustees of the Leland Stanford Junior University, Stanford, CA (US); Carnegie Institution of Washington, Washington, DC (US)

(72) Inventors: Larissa Kunz, Stanford, CA (US); Arunava Majumdar, Stanford, CA (US); Matteo Cargnello, Stanford, CA (US); Jose R. Dinneny, Stanford, CA (US); Arthur Grossman, Stanford, CA (US)

(73) Assignees: The Board of Trustees of the Leland Stanford Junior University, Stanford, CA (US); Carnegie Institution of Washington, Washington, DC (US)

( * ) Notice: Subject to any disclaimer, the term of this patent is extended or adjusted under 35 U.S.C. 154(b) by 524 days.

(21) Appl. No.: 18/044,192

(22) PCT Filed: Sep. 28, 2021

(86) PCT No.: PCT/US2021/052434
§ 371 (c)(1),
(2) Date: Mar. 6, 2023

(87) PCT Pub. No.: WO2022/067258
PCT Pub. Date: Mar. 31, 2022

(65) Prior Publication Data

US 2024/0276925 A1 Aug. 22, 2024

Related U.S. Application Data

(60) Provisional application No. 63/084,504, filed on Sep. 28, 2020.

(51) Int. Cl.
*A01G 9/24* (2006.01)
*A01G 9/14* (2006.01)
*C09K 11/77* (2006.01)
*C09K 101/00* (2006.01)

(52) U.S. Cl.
CPC ........... *A01G 9/249* (2019.05); *A01G 9/1438* (2013.01); *A01G 9/243* (2013.01); *C09K 11/7792* (2013.01); *C09K 2101/00* (2013.01)

(58) Field of Classification Search
CPC .......... A01G 9/243; A01G 9/14; A01G 9/249; A01G 9/1438; A01G 7/04; A01G 9/24
See application file for complete search history.

(56) References Cited

U.S. PATENT DOCUMENTS

| | | | |
|---|---|---|---|
| 9,295,855 | B2 | 3/2016 | Jones et al. |
| 10,591,656 | B1 | 3/2020 | Schubert et al. |
| 2011/0285295 | A1 | 11/2011 | Son et al. |

(Continued)

OTHER PUBLICATIONS

Botterman, J. et al. "Persistent phosphor SrAl2O4:Eu,Dy in outdoor conditions: saved by the trap distribution," Optics Express 23.15 (2015): A868-A881.

*Primary Examiner* — William J Carter
(74) *Attorney, Agent, or Firm* — LUMEN PATENT FIRM

(57) ABSTRACT

In some embodiments, there may be provided a luminescent material or a persistent luminescent (PersL) material that is used to redistribute sunlight. Related systems, methods, and articles of manufacture are also disclosed.

2 Claims, 13 Drawing Sheets

(56) References Cited

U.S. PATENT DOCUMENTS

| | | | |
|---|---|---|---|
| 2015/0083221 A1 | 3/2015 | Boonekamp et al. | |
| 2016/0000018 A1 | 1/2016 | Van Elmpt et al. | |
| 2020/0176625 A1 | 6/2020 | McDaniel et al. | |
| 2022/0095549 A1 * | 3/2022 | Stockum .............. | A01G 9/1438 |

* cited by examiner

Note that the absorption of red light, not shown here, closely matches the blue light absorption profile.

PHYTOPHOTONIC APPROACH TO ENHANCED PHOTOSYNTHESIS

CROSS REFERENCE TO RELATED APPLICATIONS

This application is a national stage entry of Patent Cooperation Treaty Application No. PCT/US2021/052434 filed Sep. 28, 2021, entitled "PHYTOPHOTONIC APPROACH TO ENHANCED PHOTOSYNTHESIS," which claims the benefit of priority to U.S. Provisional Application Ser. No. 63/084,504, filed Sep. 28, 2022, entitled "PHYTOPHOTONIC APPROACH TO ENHANCED PHOTOSYNTHESIS." The entire contents of these applications are incorporated herein by reference in their entirety.

SUMMARY

In some embodiments, there may be provided a luminescent material or a persistent luminescent (PersL) material that is used to redistribute sunlight.

In some embodiments, there is provided a passive lighting system configured to redistribute sunlight to facilitate photosynthesis, wherein the passive lighting system comprises a luminescent material to redistribute photons spectrally and/or temporally.

In some variations, one or more of the features disclosed herein including the following features can optionally be included in any feasible combination. The passive lighting system further comprises a concentrator, wherein the concentrator includes a body portion that is transparent to light of one or more wavelengths and further includes one or more embedded structures formed within the body portion, wherein the one or more embedded structure are comprised of the luminescent material. The one or more embedded structures comprise one or more pillars formed within the body portion. The one or more pillars form a matrix having a spacing between pairs of pillars between 0.8 mm and 1.5 mm apart. The concentrator is configured with a height between 5 and 20 mm. The one or more pillars are charged during a light phase based at least in part by light traversing the body portion of the concentrator. The concentrator is formed into a sheet to enable suspension over, and/or under, one or more plants to enable an emission of photoluminescent photons towards a top or bottom surface of the one or more plants. The luminescent material comprises a persistent luminescent (PersL) material. The persistent luminescent material comprises $SrAl_2O_4$:Eu,Dy. The body portion is composed of acrylic.

In some embodiments, there is provided a concentrator including a body comprising a body material configured to allow light to pass through the body; and a plurality of channels extending through the body, the plurality of channels comprising a luminescent material; wherein the light passing through the body is configured to charge the luminescent material, the charged luminescent material configured to provide additional light.

In some variations, one or more of the features disclosed herein including the following features can optionally be included in any feasible combination. The concentrator is configured to facilitate photosynthesis in one or more plants, and wherein the charged luminescent material is configured to provide additional light to facilitate the photosynthesis in the one or more plants. The body further comprises a body portion positioned between adjacent channels of the plurality of channels, and wherein the light is configured to pass from the body portion to the luminescent material to charge the luminescent material. The body comprises a first side and a second side opposite the first side, and wherein the body portion is positioned between the first side and the second side. The plurality of channels extends between the first side and the second side, and wherein each channel of the plurality of channels comprises: a first end; a second end; and a lateral portion extending between the first end and the second end; wherein the light is configured to pass from the body portion to the luminescent material through the lateral portion. The first end is positioned at the first side, and the second end is positioned at the second side. The first end is positioned inset from the first side, and the second end is positioned inset from the second side. The plurality of channels is defined by the luminescent material embedded in the body. The body material comprises acrylic. The body material is clear to allow the light to pass through the body. The luminescent material comprises a persistent luminescent (PersL) material. The PersL material comprises $SrAl_2O_4$:Eu,Dy. The plurality of channels is arranged in a matrix formation, and wherein, in the matrix formation, each channel of the plurality of channels is equally spaced from an adjacent channel of the plurality of channels. The matrix formation comprises a plurality of rows, and wherein each row of the plurality of rows is positioned offset from an adjacent row. The plurality of channels is at least one of coated with the luminescent material, filled with the luminescent material, and formed of the luminescent material.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
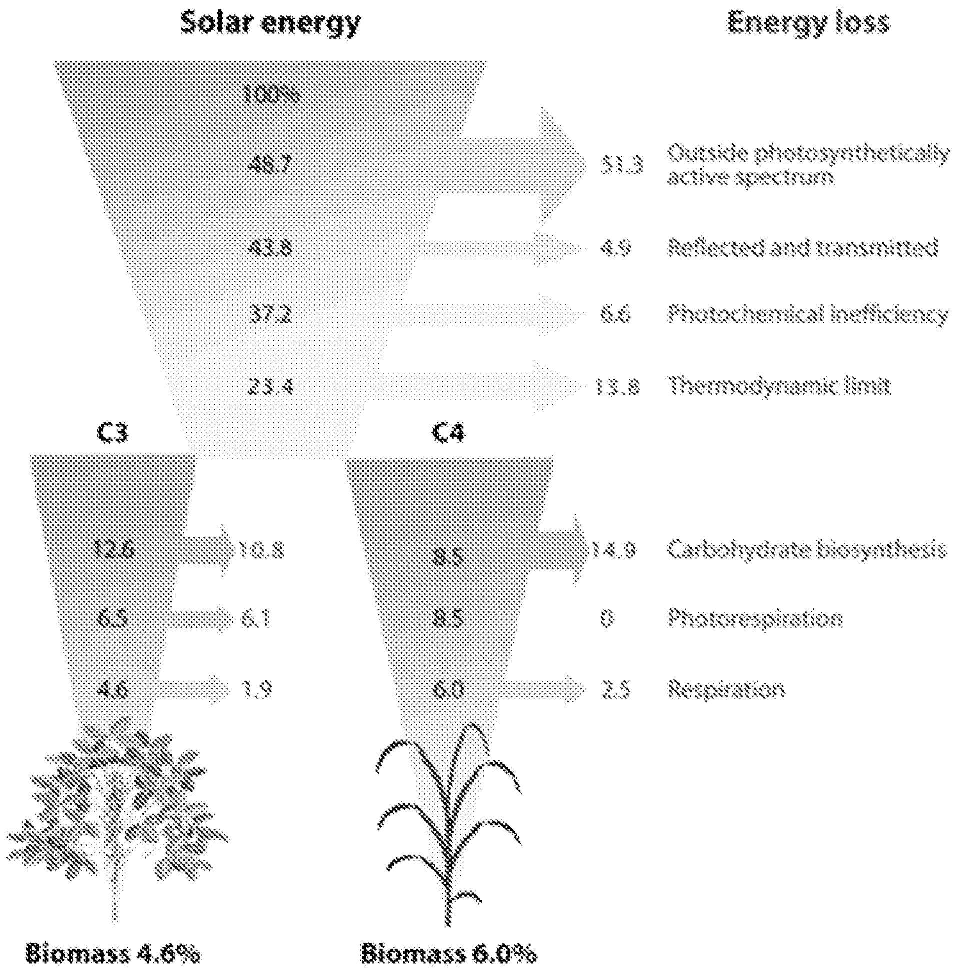
FIG. 1 depicts minimum energy loses (e.g., thermodynamic and metabolic) in C3 and C4 plant carbon fixation, in accordance with some example embodiments.

Photosynthesis is the dominant biotic carbon sink on earth and presents an opportunity for enhanced sequestration of carbon dioxide ($CO_2$). If the average net carbon fixation efficiency of terrestrial plants could be increased by 3.3% for example, some if not all anthropogenic $CO_2$ accumulating in the atmosphere could instead be reduced and incorporated into terrestrial biomass. Plants make inefficient use of the overly abundant sunlight available to them, a result of having evolved to be competitive and survive highly dynamic environmental conditions rather than maximize photosynthetic productivity.

Herein there is disclosed a phytophotonic approach to enhanced photosynthesis, whereby sunlight is redistributed using an apparatus or system that includes luminescent or persistent luminescent (PersL) materials. The disclosed phytophotonic approach may provide a spectral redistribution to relieve high-light-stress at the top surface of leaves and increasingly drive photosynthesis deeper in leaves and canopies. Alternatively, or additionally, the disclosed phytophotonic approach may provide a minute-scale temporal redistribution to bridge periods of intermittent shade and reduce shock associated with variable light conditions. Alternatively, or additionally, the disclosed phytophotonic approach may provide an extension (which may be in terms of multiple-hours or portions thereof) of the temporal redistribution to shift a fraction of high-intensity midday lighting to evening hours. In some embodiments, the approach includes the use of a fluorescent or PersL material. Alternatively, or additionally, there may be provided a concentrator containing the fluorescent or PersL material. For example, a PersL concentrator may concentrate PersL light, such that it may approach levels needed to effectively bridge periods of shade.

Before providing additional description regarding the PersL concentrator, the following may provide some insight into the problem.

Despite the accelerating growth of research and development of sustainable energy technologies, climate models predict that these technologies, influenced by the global political, economic, and social climate, will be insufficient to cap rising temperatures at 2° ° C. through the reduction of $CO_2$ emissions. To combat climate change, technologies for negative emissions must be developed to complement sustainable energy practices. With atmospheric levels slightly over 400 ppm $CO_2$, direct carbon capture from air unfortunately remains prohibitively expensive based on the inverse power law scaling of separation cost with concentration. However, biosequestration already takes place on a massive scale, with terrestrial biomass taking up about 120 gigatonnes (GT) carbon per year and oceans taking up about 90 GT carbon per year, most of which is reduced and converted into organic carbon molecules through photosynthetic processes.

As almost 10% of that terrestrial biosequestration is attributed to agricultural carbon fluxes, the carbon fixation efficiency of croplands may significantly influence the planetary carbon cycle. Not only is improved agricultural efficiency desirable for the carbon budget, but improved crop yields may also be needed to meet the food production demands of a growing population and accommodate improving standards of living. The UN Food and Agriculture Organization estimates that a 70% increase in food production will be needed by 2050 (based on 2005 production levels). Unfortunately, photosynthesis may be viewed as an inefficient mechanism when it comes to capturing solar energy into plant biomass.

FIG. 1 depicts a delineation of minimum energy loses in C3 and C4 plant carbon fixation. As shown in FIG. 1, of the solar energy incident on a plant, 51% is lost due to being outside the photosynthetically active spectrum, and 5% is lost due to reflection and transmission. Of the absorbed 44% that can hypothetically be used for photosynthesis, 20% is lost by the photosystems due to inherent thermodynamic limits, 10-15% is lost during carbohydrate biosynthesis and/or metabolism, and up to 8% is lost to photorespiration (e.g., in C3 plants) and mitochondrial respiration. Under high light intensity conditions experienced for much of the day however, less than 10% of the absorbed photons can actually be used for photosynthesis due to light saturation of sunlight leaf photosynthesis and photodamage to the photosynthetic machinery, which may drastically cut the overall efficiency. Despite the resulting less than 1% net energy efficiency of carbon fixation in most plants, a relative increase of about 3.3% (e.g., from 1% to 1.033%) in the net carbon fixation efficiency of terrestrial plants would result in the fixation of some, if not all, anthropogenically generated $CO_2$ that is currently accumulating in the atmosphere at a rate of 3 to 4 GT of carbon per year.

The development of agriculture may be considered the first, albeit unintentional, human experiment in geoengineering. Centuries of conventional tilling methods have led to soil erosion 1-2 orders of magnitude faster than soil production, with soil erosion tracking well with the rise and fall of human civilizations. Almost 40% of the earth's landmass is now covered in agricultural land. Historically, technological developments have enabled enormous improvements in the yields of croplands (comprising about 30% of the total agricultural land): the green revolution saw widespread application of selective plant breeding, coupled with the application of nitrogen fertilizers, improved irrigation, and pesticides, resulting in massive crop intensification that included a yield per hectare increase from 1960 to 2000 of 208% for wheat, 157% for maize, and 109% for rice. Key genetic improvements underlying this intensification were the production of higher yield varieties followed by the reduction of time needed to reach maturity. This intensification tripled cereal crop production and contributed up to a quarter of the 50% increase in seasonal global atmospheric $CO_2$ fluctuations-highlighting the potential to manipulate $CO_2$ levels by altering agricultural practices.

Direct attempts to increase photosynthetic efficiency (rather than crop yields) have focused on improving the activity and selectivity of enzymes in the Calvin-Benson-Bassham (CBB) cycle-especially the carboxylation enzyme Rubisco, improving the mesophyll conductance and concentration of $CO_2$ in C3 plants, and modifying the machinery for nonphotochemical quenching of absorbed light energy and the photorespiratory pathway to reduce energetic costs. Targeted manipulations of enzymes participating in the CBB cycle have demonstrated increases in $CO_2$ fixation rates up to over 30% and increases in biomass up to 60% in controlled growth environments. Recently, the introduction of an alternative photorespiratory pathway in tobacco resulted in 20% increases in photosynthetic quantum yield in the field. Other targeted manipulations of photorespiration, electron transport, energy quenching processes, and carbon transport have been reported to increase dry weight by up to 50%, 72%, and 71%, respectively, in controlled growth environments and greenhouses, with reduced benefits in field experiments. Modifications to the photosystems have also been proposed, including decreasing antenna size by decreasing chlorophyll content, which may enable reallocation of antenna nitrogen to promote carboxylation and electron transport. While these approaches show promise, single or even multigene manipulations to photosynthetic processes may not be sufficient, at least in the near term, to adequately increase yields.

Alternative approaches to enhancing photosynthetic efficiency should be considered in parallel, including modifying the growing environment to optimally use existing photosynthetic capability. Light availability is a factor that has received less attention, given that it exists above saturation thresholds for much of the growing season. While the available energy in incoming solar irradiation is seldom limiting, the temporal, spectral, and spatial distributions of that sunlight within crop canopies are not necessarily optimal for maximal carbon fixation and high yields. Certainly, seasonal variation in $CO_2$ levels on the Keeling curve suggest that longer daylight and increased light availability contribute to increased carbon fixation on a global scale. It follows that longer photoperiods may increase plant dry weight, though the specific effects can vary significantly among plant types.

Limited work has been done on redistributing light—temporally, spectrally, or spatially—and has been conducted primarily under greenhouse conditions. Photoperiods, light intensities, and spatial light distribution can be tuned in greenhouses to maximize productivity of different crops; many plants demonstrate higher yields with a lengthened photoperiod (e.g., up to about 20 hours) at reduced light intensity. Genetic modifications to confer continuous light tolerance have also been shown to increase tomato yields up to 20%. Another exigent proposal is to use chlorophyll d or chlorophyll f to extend photosynthetic activity into the near infrared (IR), but this has not yet been achieved. Solar greenhouses have increased in popularity in recent years, using transparent photovoltaics to leverage excess solar energy for power generation; the electricity is used to power the greenhouse, which can include indoor grow lights. A handful of studies have been performed on the use of fluorescent materials to increase the availability of red light; however, the scope of these studies is limited, and experiments were all performed at either low (e.g., compared to typical solar) or unspecified light intensities. And, down-converting (e.g., green-to-orange) fluorescent plastic sheeting has become commercially available to retro-fit greenhouses.

In some embodiments, there is provided a phytophotonic approach to increasing carbon fixation by modulating the delivery of light. In some implementations, the phytophotonic approach may include an increase in the usage of absorbed photons and/or the availability of light to leaves deeper in the canopy (which may be shaded). The redistribution of light (e.g., photons) may be provided using fluorescent and/or persistent luminescent (PersL) materials to redistribute photons spectrally and/or temporally. In some embodiments, the redistribution of light may be provided by a concentrator device, such as the PersL concentrator disclosed herein.

Figure 2:
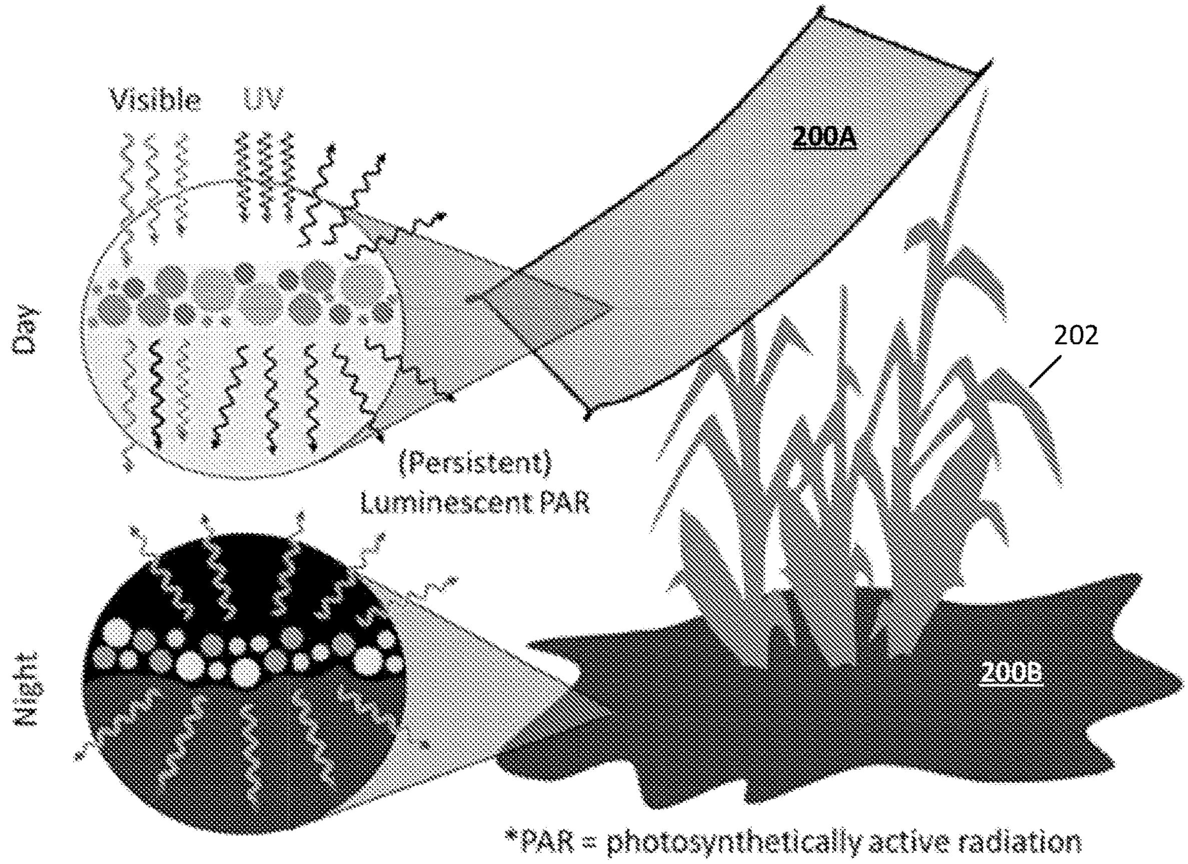
FIG. 2 depicts an example of the fluorescent or persistent luminescent material positioned above a plant or as ground cover, in accordance with some example embodiments.

FIG. 2 depicts examples of the phytophotonic approach, in accordance with some example embodiments. The PersL material 200A is positioned above a plant 202. Alternatively, or additionally, the PersL material 200B may be used below the plant 202. In the example of FIG. 2, the luminescent material, such as the PersL material 200A, may be embedded in a stabilizing matrix (or carrier such as an acrylic sheet) and is suspended over one or more plants, such that the PersL material 200A emits photoluminescent (PL) photons towards plant 202 and, more particularly, the adaxial (e.g., toward the upper surface of the leaves which usually receives light form the sun) leaf surfaces. Alternatively, or additionally, the luminescent material, such as the PersL material 200B, may be embedded in a stabilizing matrix (or carrier such as an acrylic sheet) and used as ground cover under one or more plants, such that the PersL material 200B emits photoluminescent (PL) photons towards plant 202 and, more particularly, the abaxial (e.g., toward the lower surface of the leaves) leaf surfaces.

Although FIG. 2 depicts a specific example for implementation of the phytophotonic approach based on the PersL material, the phytophotonic approach including the PersL material may be implemented in other systems or applications. In photobioreactors for example, the PersL material may take the form of a film or a coating and then be applied to a photobioreactor's outer walls to increase the efficiency of the photobioreactor system. Likewise, the phytophotonic approach including the PersL material may be used in greenhouses (e.g., including the PersL material in greenhouse covering materials to increase yield) and applied to the outdoor crop use case (e.g., distributed on croplands or as luminescent centers, for instance mounted on stakes, distributed between plants).

Figure 3:
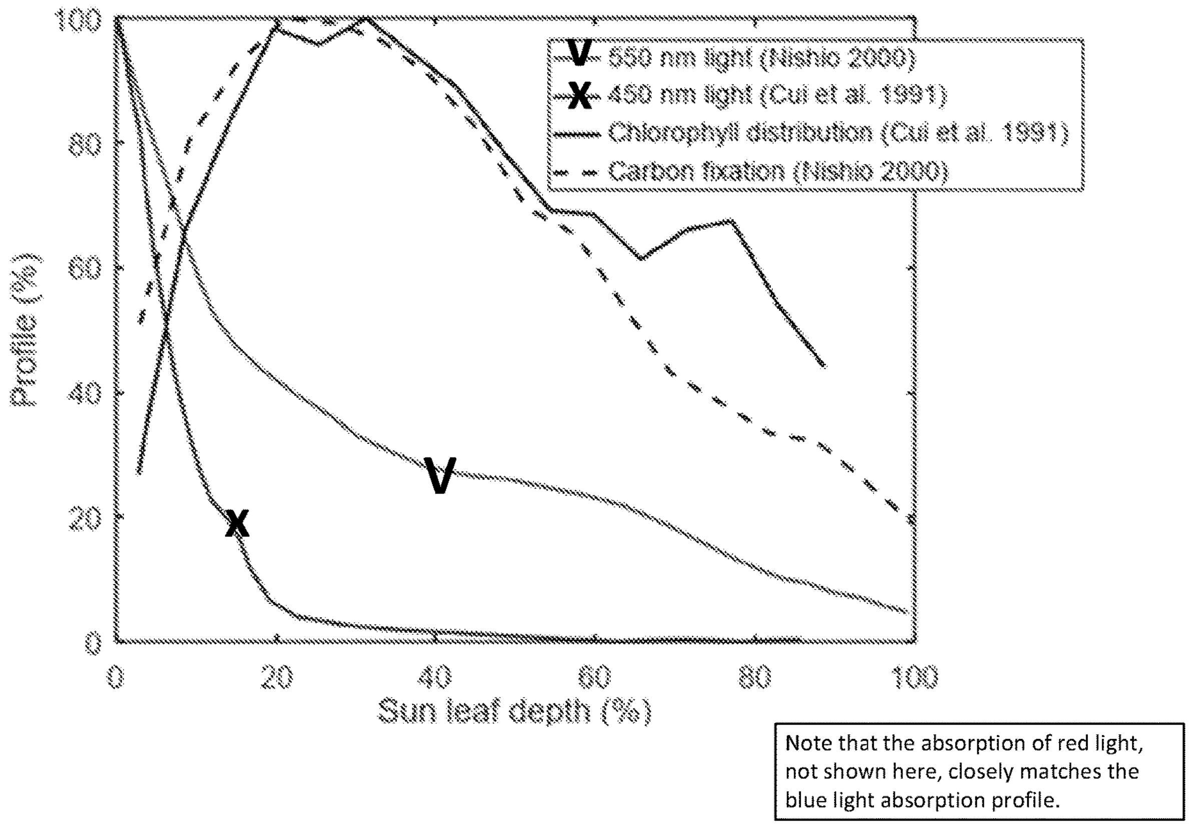
FIG. 3 depicts depth profiles for light absorption, relative chlorophyll levels, and carbon fixation for a plant, in accordance with some example embodiments.

The spectral breakdown of irradiation may impact net photosynthetic activity. Red light may have the greatest action of photosynthetically active radiation (PAR) wavelengths, when measured for individual leaves at low light intensities. Absorption of red and blue wavelengths is high, whereas absorption of green light is low. At light intensities far below stress levels (e.g., about 00-250 $\mu mol/m^2/s$ for common higher plants), red and blue light may be fully absorbed near the surface of individual leaves and drive photosynthesis efficiently—in contrast to the weakly absorbed green light. However, using higher light intensities and optical thicknesses, green wavelengths (which penetrate deeper into leaves and canopies) may actually contribute as well. FIG. 3 shows depth profiles for light absorption for a plant, which in this example is a spinach leaf. As shown by FIG. 3, carbon fixation rates (which map very closely to the concentration of the carboxylation enzyme Rubisco and the chlorophyll concentration) reach their peak in the middle of the palisade mesophyll, where overall light intensities are low and highly enriched in green wavelengths. Under high intensity lighting conditions, the top of a leaf absorbs the red and blue light and becomes saturated, activating non-photochemical quenching (NPQ) responses. The remaining, green-enriched light that penetrates deeper into the leaf (where Rubisco concentrations and chlorophyll levels are higher) is locally below saturation levels and hence will not activate NPQ responses as strongly. This greater penetration depth (combined with sieve and diffusion effects that increase the optical path length of green light) may result in relatively high green light absorption on a system-level. If one extends this to an entire canopy, despite the fact that light saturation conditions nominally prevail for much of the day at the top of the canopy, up to 50% of carbon in plants may actually be fixed under light-limiting rather than enzyme-limiting conditions. This spectral dependence may enable a dynamic response to changing light conditions, whereby surface activity (which may be driven mostly by red and blue wavelengths) is high at low light intensities, and deep activity (which may be driven by green wavelengths) is dominant at high light intensities. Generally, red and blue wavelengths may be preferred at low light intensities, whereas green wavelengths tend to be more advantageous at high light intensities.

Figure 4:
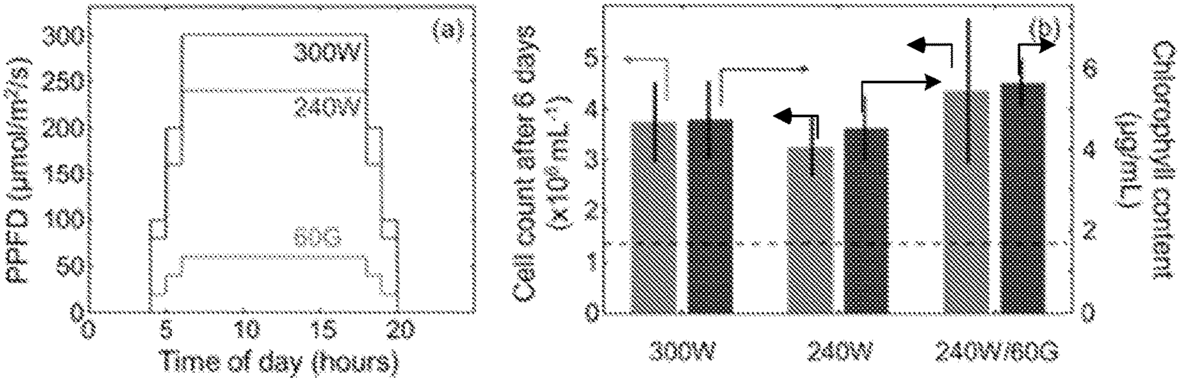
FIG. 4 and FIG. 5 depict plots of lighting profiles and cell counts, in accordance with some example embodiments.

To experimentally evaluate the impact of incorporating phytophotonic approaches on the productivity of photosynthetic organisms, some of the examples described herein used a unicellular green alga *Chlamydomonas reinhardtii* (*C. reinhardtii*). Wild type *C. reinhardtii* were grown in photoautotrophic conditions as a model system to determine the impact of green light on net photosynthetic activity. Since the algae are grown in a dispersion that is continuously being shaken, chlorophyll and enzyme depth profiles will not be maintained as they are in the structures of vascular plants; analogously, the extent of photosynthesis and NPQ depth profiles will depend on the shaking speed. However, if the hypothesis that green light significantly drives photosynthesis at greater depths is true, algae grown under green-enriched lighting may be able to grow to higher optical densities. The *C. reinhardtii* samples were grown under three lighting conditions as depicted at FIG. 4 at (a). FIG. 4 at (a) shows the lighting profiles for the noted experiments, while (b) depicts the cell counts and chlorophyll concentrations. White light intensity changed stepwise between night and day to reduce stress introduced by the change in intensity. As shown in FIG. 4 at (b), the green-enriched lighting promoted an increase in cell counts relative to samples grown under white lighting, with a mixed effects ANOVA p-value of 5.6% and 0.2% compared to strong and reduced white light, respectively. The growth profiles correspond to an average reduction in doubling time of 8% and 25% relative to the strong white and reduced light, distinct with mixed effects ANOVA p-values of 8% and 0.2%. Meanwhile, in a control experiment, growing algae under high white LED light (e.g., 270 $\mu mol/m^2/s$) and under high white light (e.g., 270 $\mu mol/m^2/s$) plus minimal green light (e.g., 525 nm, <5 $\mu mol/m^2/s$) LED lighting, no significant difference was observed in the final optical density.

Based on work in the optoelectronics, spectroscopy, and imaging communities, multitudes of fluorescent organic dyes and inorganic fluorescent nanoparticles exist. Fluorescent dyes report quantum yields approaching 100% in some cases, though the fluorescence efficiency depends on the chemical environment (e.g., solvent, surrounding polymer matrix, etc.). Candidate fluorescent nanoparticles that are free of heavy metals include Manganese-doped zinc sulfide (Mn:ZnS), zinc oxide (ZnO), and graphene quantum dots, all with emission bands in the about 50 nm to about 590 nm range and quantum yields over 50%. Inorganic nanoparticles, especially quantum dots, typically offer the advantages of high quantum yields, broad absorption bands, and readily tunable emission peak widths.

For implementation of such a spectral conversion, green-emitting quantum-dot-embedded polymer films may be optimized. Aggregation of quantum dots may be suppressed to ensure efficient fluorescence to embed quantum dots in a polymer matrix in a segregated manner, elevated-temperature, rapid oligomerization may be used to confine isolated quantum dots prior to complete polymerization. To optimize for high transmission and high downward fluorescence through a film suspended above a plant, the quantum dot density may be maximized while minimizing parasitic absorption from the polymer matrix, minimizing film thickness (e.g., about 10 μm or smaller, depending on the absorption cross-section and density of the quantum dots), and maintaining separation of the quantum dots. If used as a groundcover illuminating the abaxial sides of leaves, slightly thicker films may be preferred. Thicker films may increase net upwards rather than downwards fluorescence (abaxial illumination drives photosynthesis with lower quantum yields). Red wavelengths may be preferred for low-intensity fluorescent abaxial illumination, even under high intensity adaxial illumination.

In some embodiments, there is provided a temporal light redistribution. This temporal light distribution may address two different effects, such as (a) smoothing over shock induced by sudden or momentary shade (e.g., on the time scale of seconds to minutes) and/or (b) shifting photons from high intensity midday hours to evening or nighttime hours (e.g., on the time scale of hours), thereby increasing illumination hours.

With respect to smoothing over periods of shade on plants, the luminescent lifetimes on the timescale of seconds to minutes may provide some benefit. These periods of intermittent shade may occur throughout the day (e.g., due to cloud cover, shading from other leaves and plants, etc.). With cloud cover for example, leaves at the top of a canopy may experience rapid changes in photosynthetic photon flux density (PPFD) up to about ±1000 $\mu mol/m^2/s$, while mid-canopy leaves (which may rely on sun flecks to drive photosynthesis) may experience rapid fluctuations over ±1500 $\mu mol/m^2/s$. Under the high light intensity of full sun for example, the protective NPQ mechanisms are active and thus dissipate excess energy contained within excited pigments as heat. These NPQ mechanisms may persist for multiple minutes past the onset of shade, reducing photosynthetic rates and ultimately decreasing carbon assimilation by 20% or even more. The work done on reducing this loss includes genetic manipulations to accelerate the shade relaxation of NPQ in tobacco plants, which has been shown to increase plant biomass by 15%. The transition from shade back to sun then suffers a second set of inefficiencies due to reactivation of photosynthetic machinery. Wheat, for instance, has been shown to require about 15 minutes to recover maximum photosynthetic efficiency after being transferred from shade to sun—a slow response driven primarily by the activation of Rubisco and secondarily by the opening of stomata; this slow recovery has been shown to reduce net assimilation by as much as 21%.

The kinetics of photosynthetic responses to variable light conditions may be well characterized for many systems. While predicting optimal lighting conditions is plant- and location-specific and remains difficult, guidelines may be outlined. The timescales of activation/deactivation of NPQ, Rubisco, and stomatal conductance are seconds to about 1 minute, about 10 minutes, and about 10 minutes, respectively. As such, persistent luminescence on the order of seconds to minutes may already be useful in fully bridging brief periods of shade. Moreover, the luminescent intensity may be sufficiently bright to drive photosynthesis (e.g., greater than about 1 $W/m^2$ or 5 $\mu mol/m^2/s$). A gradual decay in luminescent intensity over a few minutes may be preferred to smooth the transition from full sun to shade and back. Furthermore, self-shading (e.g., of the lower canopy by the upper canopy) may be significant and highly variable in wind and other conditions, so intra-canopy light distribution may be a factor as well.

Figure 5:
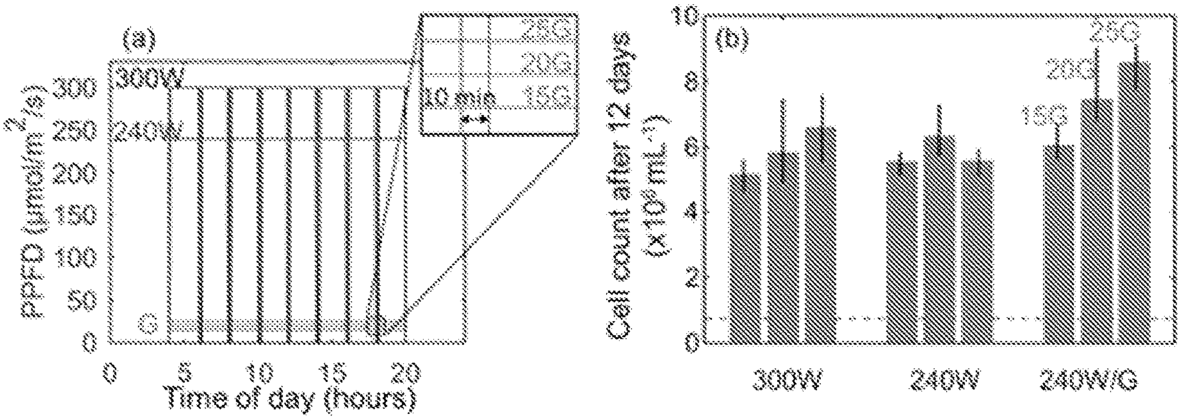

With respect to desirable lighting conditions, certain preliminary experiments were performed on the impact of low-level (e.g., about 20 μmol/$m^2$/s) continuous green lighting combined with fluctuating white light, again with the unicellular green alga (*C. reinhardtii*). Green light was used as it is currently the most efficient PersL materials with respect to emission of green light. Samples of *C. reinhardtii* were grown in photoautotrophic conditions under variable lighting conditions, including: (a) 16 hr/day high-level white LED lighting (intensities that just saturate photosynthesis in the algae, 300 μmol/$m^2$/s); (b) 16 hr/day 23%-reduced intensity (240 μmol/$m^2$/s) white LED lighting; and (c) 16 hr/day 23%-reduced intensity (240 μmol/$m^2$/s) white LED lighting combined with 16 hr/day low-level green LED lighting (525 nm, 15, 20, and 25 μmol/$m^2$/s for three different samples). Note that for (c) the maximum light intensity was 260 μmol/$m^2$/s, lower than the 300 μmol/$m^2$/s used in (a) and thereby simulating a sub-unity luminescence efficiency. Light shock (e.g., to mimic shade) was introduced via seven 10-minute periods throughout the day during which the white LED lighting was turned off. FIG. 5 at (a) depicts plots of the lighting profiles for these experiments. After 12 days, cell counts were observed to be marginally elevated in the samples under higher green light as shown at FIG. 5 at (b), with a mixed design ANOVA p-value of 7.4%.

In some embodiments, the PersL material is composed of (or comprises) strontium aluminate-based oxides with various dopants. Moreover, the strontium aluminate-based oxides may be tunable with relatively high quantum yields, tunable absorption/emission spectra, and tunable decay times. For example, the decay times may be tuned to match a typical duration needed to bridge periods of shade. Likewise, absorption and emission spectra may be tuned to optimize for maximum increase in biomass yield, which may balance any wavelength-dependent signaling independent of photosynthetic processes with wavelength-dependent, system-level photosynthetic efficiencies. The absorption and emission spectra of strontium aluminate may be tuned by varying the crystal structure and doping with various metals. Resulting emission spectra peak anywhere from ultraviolet (UV) to red, with quantum yields up to about 90% at room temperature.

Figure 6:
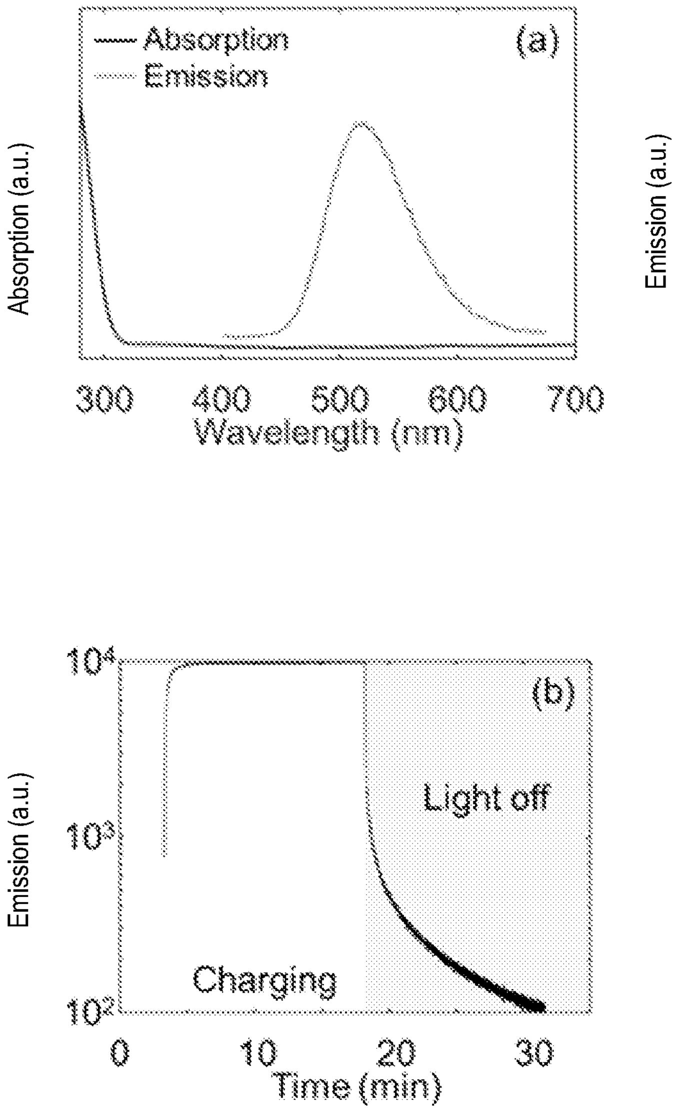
FIG. 6 depicts plots of absorption and emission spectra and of the luminesce kinetics for charging and discharging, in accordance with some example embodiments.

In some embodiments, monoclinic $SrAl_2O_4$:Eu,Dy (which is a persistent phosphor with a persistence time on the order of hours and a high quantum yield) may be used in accordance with some embodiments. The absorption and emission spectra of Monoclinic $SrAl_2O_4$:Eu,Dy are shown in FIG. 6 at (a), while FIG. 6 at (b) shows a plot of the luminesce kinetics for charging and discharging. Although some of the examples refer to monoclinic $SrAl_2O_4$:Eu,Dy, variants of monoclinic $SrAl_2O_4$:Eu,Dy with surface coatings that down-convert the emission may be used as well as but their emissions may be less bright.

Despite its high quantum yield, $SrAl_2O_4$:Eu,Dy may be insufficiently bright on its own. While afterglow may persist for many hours after charging for example, the emission intensity may drop two orders of magnitude within minutes of charging, as shown in FIG. 6 at (b). Other commercially available materials may also undergo this same drop in intensity within seconds. Under direct sunlight for example, a film of $SrAl_2O_4$:Eu,Dy embedded in a poly(methyl methacrylate) matrix may emit up to about 5 watts (W)/$m^2$ (e.g., about 20 μmol/$m^2$/s) within seconds to minutes of being placed in the dark, but the luminescent intensity drops to about 0.01 W/$m^2$ (e.g., about 0.05 μmol/$m^2$/s). As a minimum light intensity needed to drive photosynthesis is about 1 W/$m^2$ (e.g., about 5 μmol/$m^2$/s), the emission intensity may need to be increased by about two orders of magnitude to be useful in smoothing over light fluctuations.

While most high quantum yield PersL materials are based on strontium aluminate, recently organic PersL molecules have been developed, capable of luminescing up to the timescale of hours via exciplex emission of charge-separated states, a significant improvement over the timescale of seconds typically achievable by mere phosphorescence. Unfortunately these organic PersL systems still have relatively low quantum yields below 50%, including both immediate fluorescence and the delayed persistent luminescence. Biocompatible, organic PersL systems might offer benefits as luminescent dyes down the road if integrated into the upper epidermis and/or palisade mesophyll of leaves, but even greater improvements in luminescent intensity will be needed for these organic PersL molecules than for the inorganic PersL materials.

Figure 7:
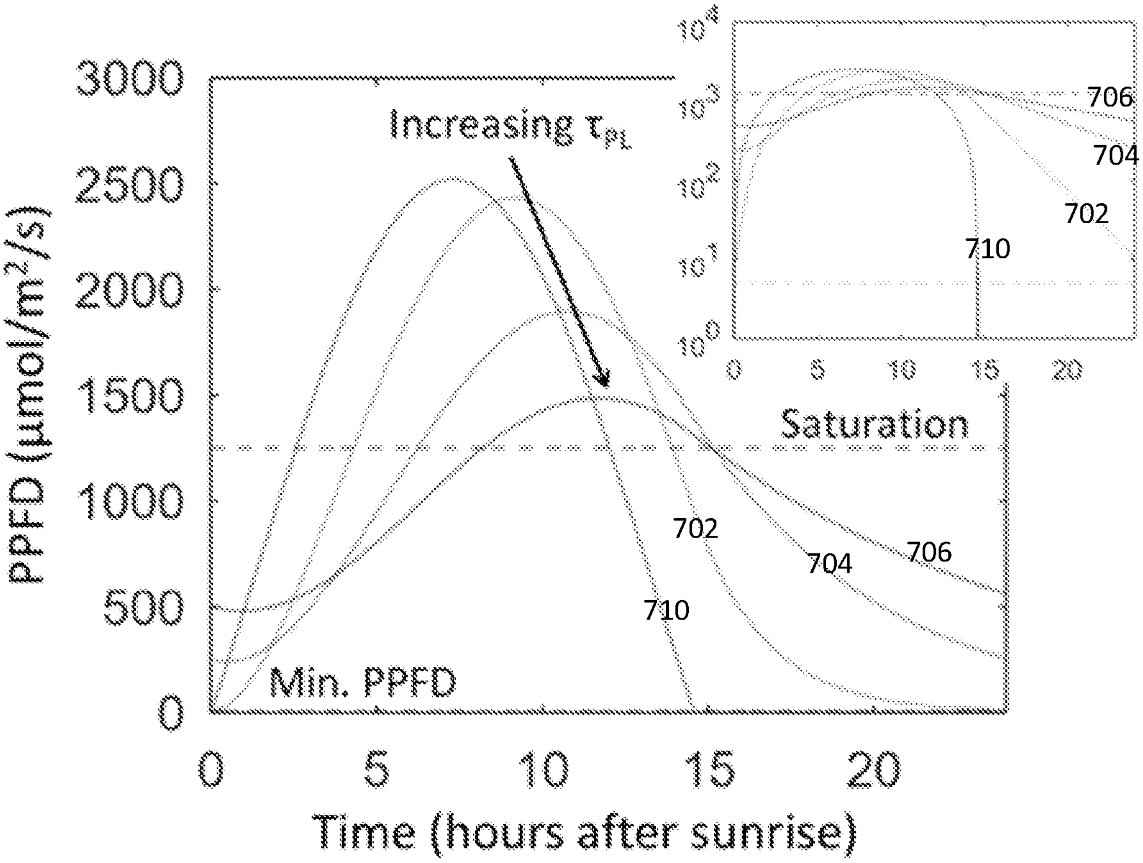
FIG. 7 depicts scenarios of shifted distributions for persistent luminescent, in accordance with some example embodiments.

With respect to increasing illumination hours, midday light saturation conditions exist well into the Arctic Circle at the height of summer in the northern hemisphere, and vegetation within the tropics experiences midday light saturation intensity year-round. FIG. 7 shows an example plot of the distribution of light intensity throughout a clear day-beginning at sunrise at the summer solstice. Assuming photosynthetic light compensation at 5 μmol/$m^2$/s and saturation at 1250 μmol/$m^2$/s, about 20% of available photons lie above saturation levels for a typical sun plant (about 45% for a typical shade plant, assuming saturation at 750 μmol/$m^2$/s), and protective quenching responses reduce the efficiency with which absorbed photons can be used, such that less than 10% of absorbed PAR photons are actually used to drive photosynthesis under these conditions. Meanwhile, longer daylight hours may increase the dry weight of plants. Evidence also points to benefits of low intensity long day light treatments over high intensity short day lighting, perhaps in part a result of the hyperbolic relationship between PPFD and net photosynthetic rate (within the range of useful light intensities).

Although photovoltaics (e.g., photovoltaics and batteries to then power LEDs) may be used to temporally redistributing light, photovoltaics may achieve up to 10% efficiency, so accounting for battery and LED efficiency, such a setup may present at best about a 5% increase in useful photon availability. Alternatively, or additionally, the persistent luminescent (PersL) material, in accordance with some embodiments, may be used to shift a portion of the incoming sunlight from the high light intensity midday to the evening hours. FIG. 7 depicts so-called "best-case" scenarios of this shifted distribution for persistent luminescent covers that re-emit UV and photosynthetically active radiation (PAR) photons as PAR with 2 hr 702, 5.5 hr 704, and 11 hr 706 characteristic decay times with regular sunlight plotted at 710. In a photobioreactor or greenhouse, this redistribution might be achieved by integrating a PersL material into the photobioreactor walls or greenhouse roof, respectively. Down the road, further innovations could enable direct application of solid PersL materials to the leaf surfaces and/or transgenic integration of luminescent dyes into the upper epidermis and/or palisade mesophyll cells of leaves, where light intensity is highest, more readily expanding application to outdoor crops.

Figure 8:
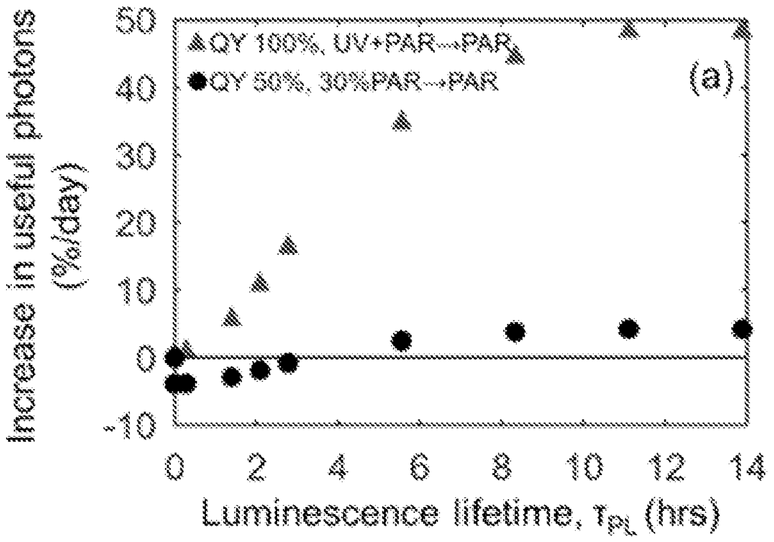
FIG. 8 depicts a plot of an increase in cumulative number of photons between the minimum PPFD for photosynthesis and light saturation as a result of a PersL concentrator with various decay times and plots the trade-off in the integral useful photon count with increased absorption of PAR, in accordance with some example embodiments.
Figure 8:
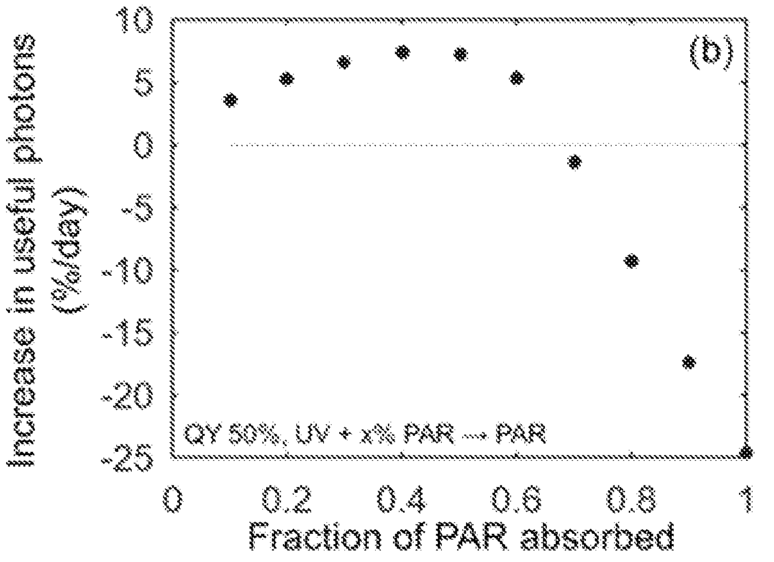

To illustrate, an ideal PersL lighting system may re-emit absorbed photons with 100% quantum efficiency towards the plants, for example. This ideal increase in useful photons over the course of the day may correspond to the integrated PPFD from FIG. 7 between the minimum to drive photosynthesis and the saturation level and is shown in FIG. 8 at (a), which assumes all UV and visible wavelengths are absorbed and re-emitted in the visible range. This result sets the upper bound on the potential increase in useful photon availability over the course of a day (for a sun plant located at Stanford University, for example) at about 50%. FIG. 8 at (a) shows an increase in the cumulative number of photons between the minimum PPFD for photosynthesis and light saturation as a result of a PersL concentrator with various decay times. FIG. 8 at (b) plots the trade-off in the integral useful photon count with increased absorption of PAR.

Referring again to FIG. 2 with a PersL sheet 200A suspended above the plant 202, maximally 50% of the luminescent photons may be emitted down towards the plant 202, unless a mechanism such as a dichroic mirror or other means of capturing upwards luminescent photons is implemented. As a result, there is a trade-off between increasing the fraction absorbed by the PersL cover to increase downwards luminescence and maintaining sufficient transmission of incoming PAR wavelengths so as to not lose too many quanta to upwards luminescence. As shown at FIG. 8 at (b), an optimum ensues, at which point the cumulative number of usefully available photons may be maximized. From a photon-accounting perspective, efficiencies of 50% or lower may require that long luminescent lifetimes be achieved to guarantee an increase in photon availability. The second set of calculations in FIG. 8 at (a) indicate that a lifetime short of about 4 hours actually results in a net decrease in available photons; these calculations are based on the assumption that 30% of PAR is absorbed by the PersL sheet/material, with no contribution from the UV. UV-B light may be important for signaling high light intensity conditions via the UVR8 receptor, so UV-free lighting might be undesirable. While these calculations provide some indication of changes that might be anticipated in PAR photon availability, the photosynthetic activity ultimately depends nonlinearly on these changes. Likely more significant in driving up net assimilation than increased integral photon availability are (a) the resulting lengthening of periods of low-intensity lighting (given the hyperbolic relationship between PPFD and net photosynthetic rate) and (b) the accompanying reduction in the load on protective quenching processes. Shade plants may see greater benefits, given that their photosynthetic rates saturate at lower PPFDs. It is clear, however, that longer PersL lifetimes are preferred, within the limits of diurnal cycle requirements for the plant(s) of interest. The same PersL materials noted above may also be relevant here but long luminescent lifetimes may be even more important. For example, the $SrAl_2O_4$:Eu,Dy may be the most viable candidate for meeting these long lifetimes, but the emission intensity issue noted above may be problematic over these longer lifetimes: the emission intensity needs to be increased by at least four orders of magnitude to be useful in lengthening daylight hours.

To provide a time (or temporal) delay in light (or photon) emission, a limiting factor to the disclosed phytophotonic approach for enhancing photosynthesis is the brightness of the PersL materials. For example, the $SrAl_2O_4$:Eu,Dy may store light by relatively deep traps below the conduction band, believed to be either oxygen vacancies or traps related to the presence of dysprosium. Excited electrons trapped in these states are gradually either thermally stimulated or tunnel over to europium fluorescent centers for recombination. But generally the persistent luminescence is a bulk material property. The larger $SrAl_2O_4$:Eu,Dy crystals tend to be brighter than small crystals. And, the shape of the luminescence decay curve may be indicative of a multitude of trap states with various characteristic times for recombination (as can be deduced by exponential analysis). Surface passivation may be useful in suppressing recombination via surface states; many commercial products achieve brighter and longer luminescence in the dark with this strategy, effectively converting fluorescence to PersL.

In some embodiments, $SrAl_2O_4$:Eu,Dy is used as the material for the PersL concentrator. FIG. 6 plots some of the characteristics of the $SrAl_2O_4$:Eu,Dy. Based on the decay kinetics measured at 525 nm (see, e.g., FIG. 6 at (b)), over 99% of the traps have lifetimes greater than 1 second. The relatively high emission intensity under illumination is a result of repeated, rapid excitation, and fluorescent recombination. Under illumination, at most 80% of the emission may be ascribed to delayed luminescence (assuming a cut-off at 1 second (s)). And, a reasonably high quantum yield of 65±10% may be realized for $SrAl_2O_4$:Eu,Dy. Total absorption and emission may be increased by decreasing scattering boundaries and/or increasing the surface area over which light interacts with the sample. The relatively high refractive index (measured to be between 1.65 and 1.66 with the Becke Line Test) may explain the high degree of scattering. While scattering boundaries may be reduced by processing $SrAl_2O_4$:Eu,Dy into a glass ceramic, exigent methods of doing so require reducing conditions at high temperatures (1500° C.) and may be impractical. Increasing the chances for absorption, similar to a luminescent solar concentrator, may be more practical from an implementation perspective. To that end, FIG. 9 depicts an example of the PersL material configured as a PersL concentrator, in accordance with some embodiments.

Figure 9:
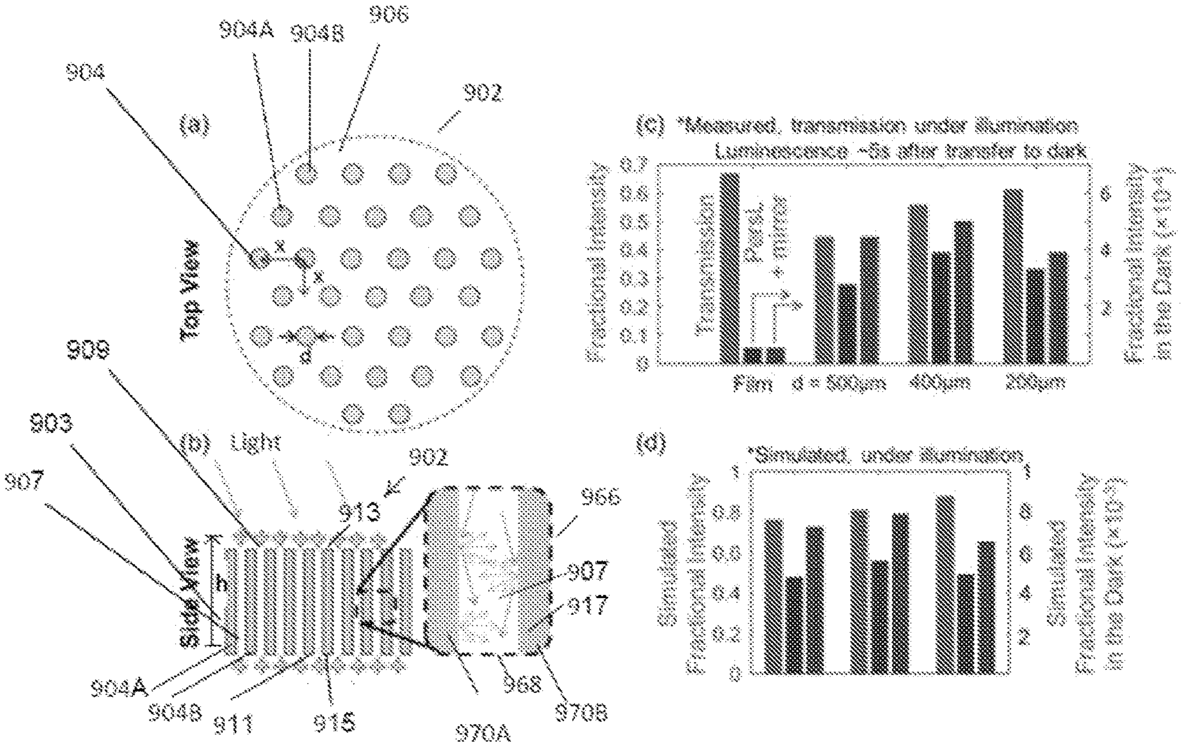
FIG. 9 depicts top and side views of the PersL concentrator including experimental and simulated results, in accordance with some example embodiments

FIG. 9 shows the top view of the PersL concentrator at (a) and a side view at (b), in accordance with some embodiments.

The PersL concentrator 902 may include a body 903, such as a sheet. The body may include a body material configured to allow light to pass through the body. For example, the body material of the PersL concentrator 902 may include acrylic 906 or other material transparent (or translucent) to the desired light (e.g., visible wavelengths), such that the acrylic material passes light.

The PersL concentrator 902 may include one or more holes, such as holes 904A, 904B, and so forth. In the example of FIG. 9, the holes are formed as circles (see, e.g., shaded circles), although other shapes may be used as well (e.g., squares, triangles, and/or the like). These holes may form channels or pillars (or, e.g., other type of embedded structures) through at least a portion of the acrylic material (e.g., the body) and include (or be filled with) a luminescent material, such as a PersL material. In other words, the body of the PersL concentrator 902 may include a plurality of channels 904 extending through the body 903. The plurality of channels 904 may include a luminescent material. For example, the plurality of channels 904 may be coated with the luminescent material, filled with the luminescent material, and/or formed of the luminescent material. In the example of FIG. 9, the acrylic material 906 is shown as clear (or unshaded) while the filled holes 904A, B, etc. are illustrated as shaded. In the example of FIG. 9, the holes are filled with $SrAl_2O_4$:Eu,Dy, although other types of fluorescent material or persistent luminescent phosphor may be used as well. Referring to FIG. 9 at (b), the clear portions of acrylic allow light to pass through or traverse the concentrator, while charging the adjacent PersL material as shown by the inset 966, where the clear portion 968 allows the light to traverse the device while energizing or charging the adjacent pillars 970A-B. The clear portions of the acrylic advantageously provide a light channel that charges the adjacent pillars of PersL material.

The body 903 may include a first side 909 and a second side 911 opposite the first side 909. The body 903 may also include a body portion 907 positioned between the first side 909 and the second side 911. The body portion 907 may be positioned between adjacent channels of the plurality of channels 904. As shown in FIG. 9, the light (e.g., sunlight) may pass from the body portion 907 to the luminescent material to, for example, charge the luminescent material.

In some embodiments, the plurality of channels 904 extends between the first side 909 and the second side 911. Each channel of the plurality of channels 904 may include a first end 913, a second end 915, and a lateral portion 917 extending between the first end 913 and the second end 915. The lateral portion 917 may form a side surface or side wall of the plurality of channels 904. The lateral portion 917 may additionally or alternatively define an interface between the luminescent material and the body material of the body 903. The light is configured to pass from the body portion 907 to the luminescent material through the lateral portion 917.

In some embodiments, the first end 913 of the plurality of channels 904 is positioned at the first side 909 of the body 903 and the second end 915 of the plurality of channels 904 is positioned at the second side 911 of the body 903. In other embodiments, the first end 913 of the plurality of channels 904 is positioned inset from the first side 909 of the body 903 and the second end 915 of the plurality of channels 904 is positioned inset from the second side 911 of the body 903.

The holes or pillars may form a structured pattern of evenly spaced holes as shown by the matrix pattern of FIG. 9 at (a). In the example, the holes are spaced "x" distance from each other. Each hole has a diameter "d" as shown. In some implementations, the concentrator is configured with a distance x of 1.4 mm and with the diameter d of 500 μm, 400 μm, or 200 μm, although other sizes may be realized as well. In the example of the PersL concentrator 902 side view at FIG. 9 at (b), the thickness or height (labeled h) is 6.4 mm, although other heights may be realized as well. FIG. 9 at (c) plots examples of experimental results of fractional intensity (relative to incoming light) of transmission on the left vertical axis, and the right vertical axis plots fractional intensity of luminesce without and with a downwards reflective surface at the top. FIG. 9 at (d) presents plots of Monte Carlo simulation results corresponding to the experimental results at FIG. 9 at (c).

Figure 10:
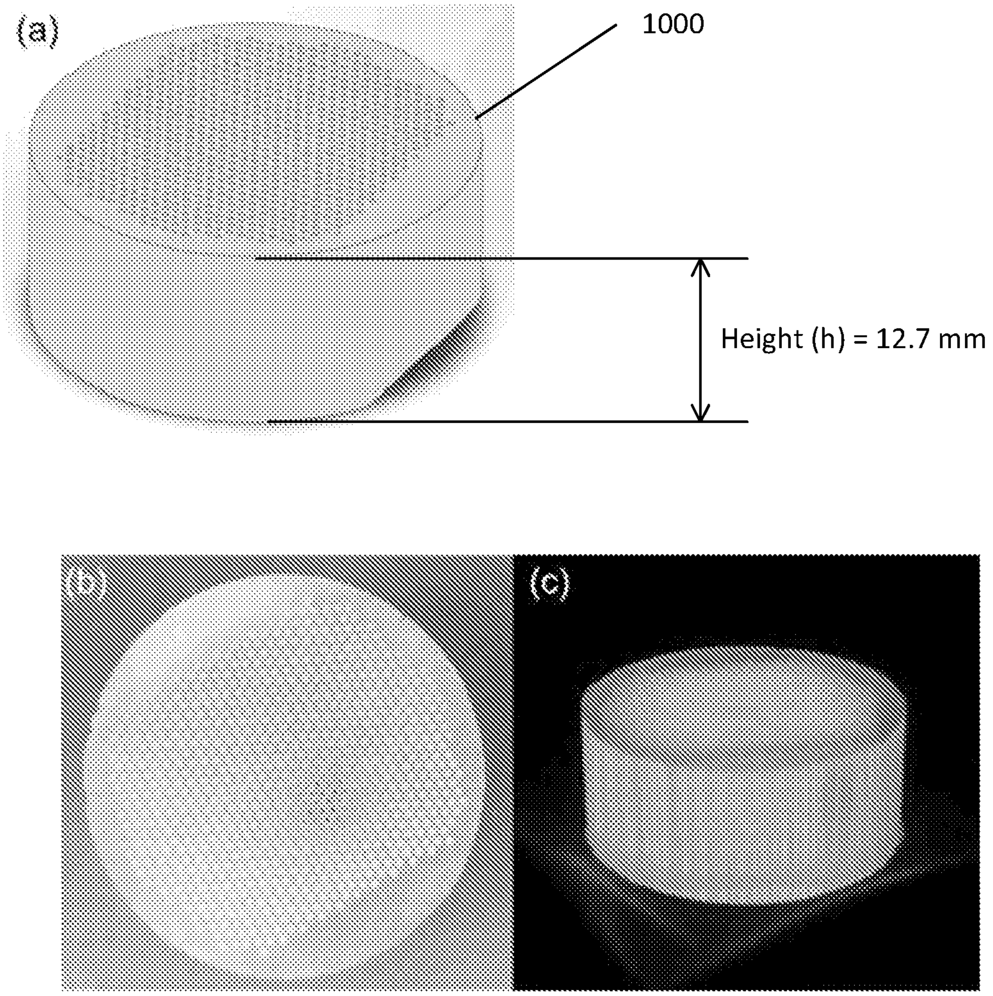
FIG. 10 depicts an example of a CAD model of a PersL concentrator, in accordance with some embodiments.

FIG. 10 depicts an example of a CAD model of a PersL concentrator 1000, in accordance with some embodiments. The second design of the PersL concentrated depicted at FIG. 10 is different with respect to hole spacing (x), diameter (d), and the like, when compared to the first design of the PersL concentrator depicted at FIG. 9. In the example of FIG. 10, the PersL concentrator is configured with the following: x=800 μm, $w_{avg}$=1.3 mm, d=400 μm, and h=12.7 mm, although other values may be realized in the design configuration. FIG. 10 at (b) shows the top view photograph of the PersL concentrator before the holes are filled with the PersL material, such as $SrAl_2O_4$:Eu,Dy powder. FIG. 10 at (c) shows a photograph of the PersL concentrator after charging with simulated sunlight and then transferring it into the dark.

Figure 11:
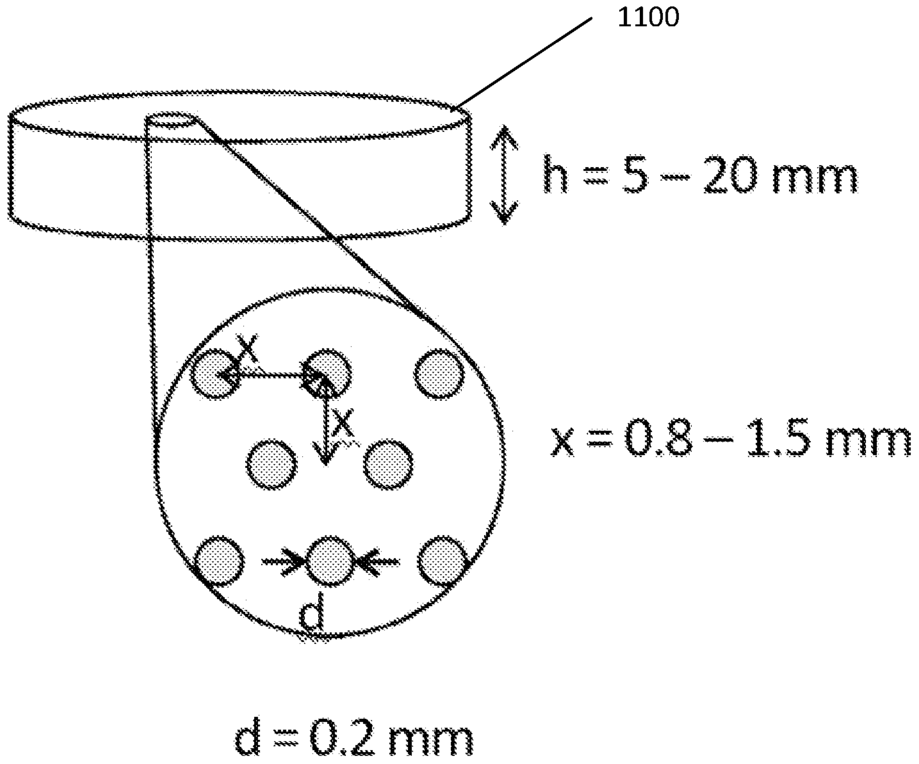
FIG. 11 depicts another example of a PersL concentrator, in accordance with some embodiments.

FIG. 11 depicts another view of the PersL concentrator 1100, in accordance with some example embodiments. In the example of FIG. 11, the height h may be configured (e.g., manufactured) between 5 mm and 20 mm. The distance between the holes (x) may be configured between 0.8 mm and 1.5 mm, with a diameter (d) of the holes of 0.2 mm.

Referring again to FIG. 9, the PersL concentrator 902 may, as noted above, include holes forming pillars (e.g., columns or other types of embedded structures) of $SrAl_2O_4$:Eu,Dy particles embedded in the transparent acrylic carrier 906. For example, incoming light may traverse and scatter repeatedly off these $SrAl_2O_4$:Eu,Dy pillars (as shown at the inset 966), thereby increasing the net probability for light absorption and subsequent luminescent emission. Surface-passivated 50-75 μm $SrAl_2O_4$:Eu,Dy particles may be packed into the holes (which may be cut with a laser or other mechanism). The angle-averaged spacing between columns, $w_{avg}$, may be 3.9 mm (which correspond to x=1.4 mm, as shown at FIG. 9 at (a), a height of 6.4 mm, and multiple column diameters of d=500 μm, 400 μm, and 200 μm), although other spacings and diameters may be realized as well. The optical properties of the PersL concentrator under simulated solar light and then in the dark (e.g., about 5 s after charging with illumination) are experimentally plotted at (c) at FIG. 9 and verified with a Monte Carlo simulation at (d). The transmission increases with smaller column sizes, covering a smaller fraction of the top surface area. An optimum may be seen in fluorescent intensity, balancing increased path length of a ray of light through the device with parasitic absorption by the acrylic. Since the typical UV and blue light (which induce luminescence) penetration depths into metal oxides are less than 1 μm, a minimum column diameter may be reached based on the particle size rather than radiative transport.

To determine a so-called "optimal" PersL configuration, diffuse light travelling through the PersL concentrator was characterized with Monte Carlo simulations. The trends in transmission and fluorescence observed experimentally at FIG. 9 at (c) were reproduced with the Monte Carlo as shown at FIG. 9 at (d). The PersL concentrator prototype 902 had an angle-averaged spacing of $w_{avg}$=3.9 mm and a height of 6.4 mm and increased luminescent intensity by almost one order of magnitude. The sensitivity analyses suggest that decreasing the spacing and increasing the height can further increase the luminescent intensity up to about one additional order of magnitude. To this end, a second design for the PersL concentrator was configured as shown at FIG. 10 at (a) (e.g., geometric parameters: x=800 μm, $w_{avg}$=1.3 mm, d=400 μm, and h=12.7 mm). The concentrator of FIG. 10 was 3D printed (as opposed to laser-cutting the holes as in the case of FIG. 9 at (a)) to enable constant hole width over this larger height. Simulation of the device of FIG. 10 at (a) predicted about a 3.5-fold improvement over the concentrator design of FIG. 9 at (a). These improvements in luminescent intensity can now be compared to the increases needed to realize the goals of lengthening days and/or bridging shade. Meaningfully, smoothing over light fluctuations are feasible.

In some embodiments, there is provided a fluorescent concentrator or down-converter. Fluorescent down-converting materials may be used to convert higher energy photons to PAR photons. UV photons are converted to green wavelengths to target unsaturated photoreceptors deeper within individual leaves and lower in the canopy. These fluorescent materials can be applied as a thin film to the surface of bioreactors (e.g., for enhanced algal yields for biofuel production), as a thin film on greenhouse roofing material (especially for increased crop yields), or might even—when using nontoxic fluorescent materials may be applied directly to the surface of outdoor plants.

In some embodiments, there is provided phosphorescent materials to effectively lengthen daily irradiation hours. Since available red and blue photons can saturate photosystem electron transport during high intensity illumination hours, phosphorescent coatings can be used to spread that excess solar intensity over time, thereby making more efficient use of those photons. Analogously, down-converting phosphorescent materials can be used for an added efficiency boost. This phosphorescence also bridges periods of heavy shade, offsetting the downtime induced by the activation of the CBB cycle when switching back to higher light intensity conditions.

Figure 12:
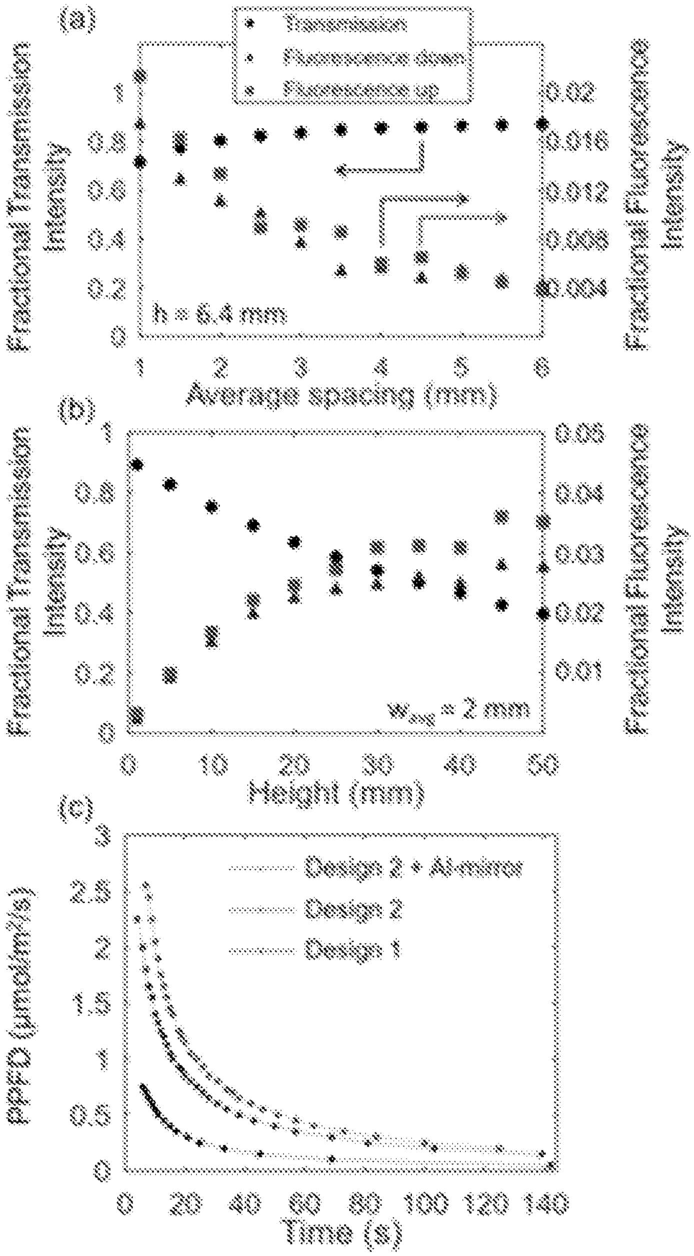
FIG. 12 depicts plots of experimental and simulation results for a PersL concentrator, in accordance with some example embodiments.

FIG. 12 at (a) provides plots of a sensitivity analysis of the Monte Carlo simulation-derived transmission (left axis) and fluorescence up and down (right axis) to the angle-averaged spacing between pillars of $SrAl_2O_4$:Eu,Dy having diameters of 200 μm. For reference, the value of x=1.4 mm used at FIG. 9 at (c) and (d) correspond to angle spacing (w) of 3.9 mm. FIG. 12 at (b) shows the Monte Carlo simulation-derived transmission (left axis) and fluorescence up and down (right axis) to the height of the concentrator, assuming an angle-averaged spacing between columns of $w_{avg}$=0.2 mm and $SrAl_2O_4$:Eu,Dy having diameters of 200 μm. FIG. 12 at (c) plots the measured luminescence kinetics of the improved device (design 2 which refers to concentrator 1000 at FIG. 10), with and without a top, reflective (aluminum) surface, compared against the concentrator 902 of FIG. 9 (labeled design 1).

Figure 13:
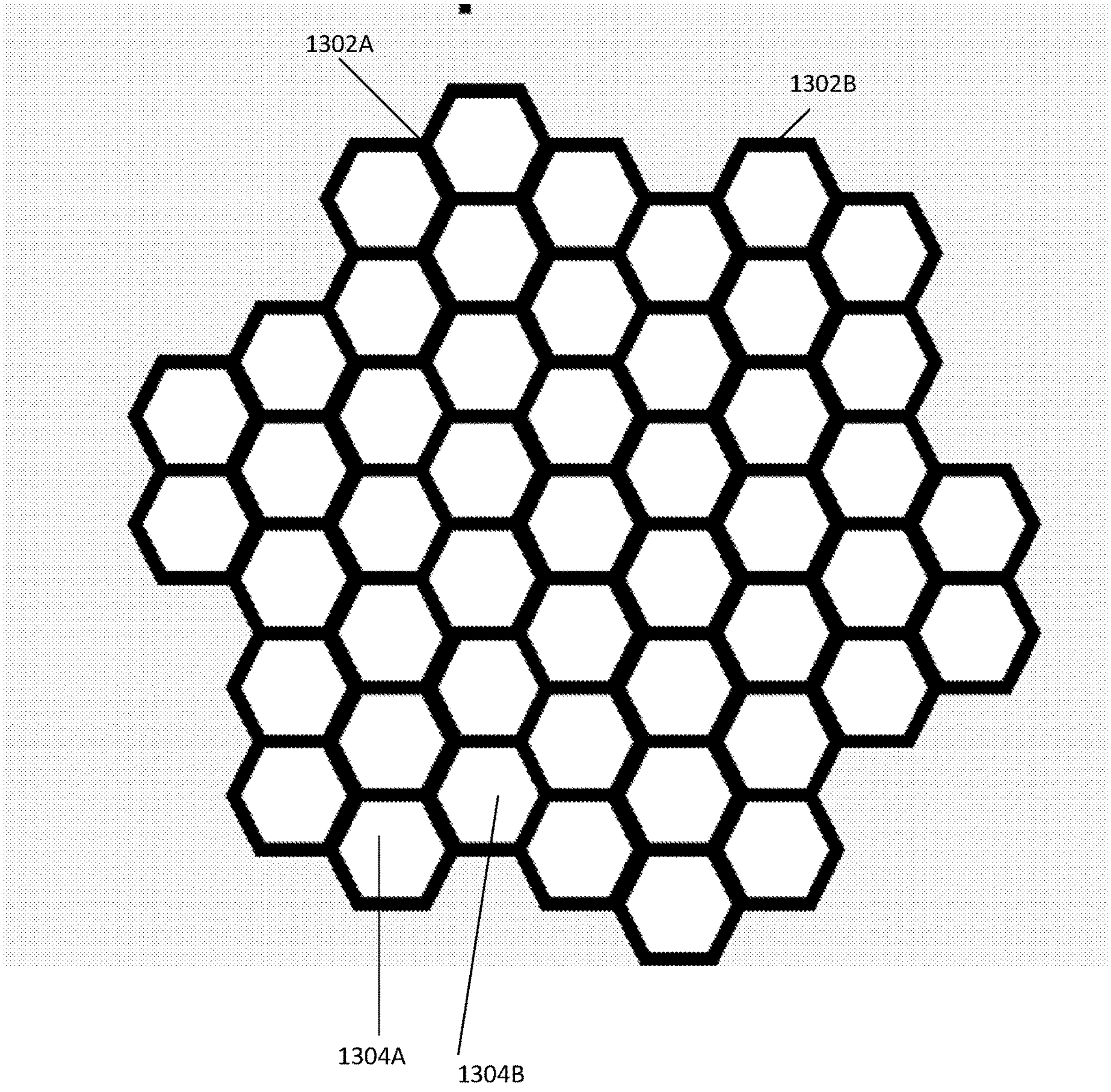
FIG. 13 depicts an example implementation of a honeycomb structure, which may be used for the PersL concentrator, in accordance with some embodiments.

Simulation of the device predicted about a 3.5-fold improvement over "design 1" (which corresponds to the concentrator 902) as shown in FIG. 12 at (c). The 3-fold improvement was observed experimentally, and a PPFD over 0.1 μmol/$m^2$/s was maintained for a couple minutes. As such, the design 2 (which corresponds to concentrator 1000) device demonstrates nearly 30× improvement over the bare sample. In terms of further improving upon this concentrator device, it is worth noting that spacing below 2 mm and heights above 20 mm (for 200 μm holes) may be prohibitively difficult to fabricate. Improvements in 3D printing technology may help in this attempt. These improvements in luminescent intensity can now be compared to the increases needed to realize the goals of lengthening days and/or bridging shade. Meaningfully, smoothing over light fluctuations appears feasible. Only about 2 orders of magnitude improvement in luminescent intensity are required, and the first order of magnitude was already achieved with a preliminary PersL concentrator prototype (see FIG. 12 at c). Simulation indicated that further optimization should yield the second order of magnitude, and the feasibility of using 3D printing to fabricate these devices opens up a host of possible alternative geometries that might further increase PersL concentration. Alternative, or additional, geometries include more complex honeycomb-like structures or structures that selectively bend or otherwise re-orient the outgoing light. FIG. 13 depicts an example implementation of a honeycomb structure, which may be used for the PersL concentrator. In the example of FIG. 13, the top view of the PersL concentrator having a honeycomb structure is shown, rather than the round holes of FIG. 9 at 904A and B, for example. In this example, the solid lines, such as 1302A, B, may correspond to the luminescent material (e.g., comprised of $SrAl_2O_4$:Eu,Dy), and the interior (unshaded) portions of the hexagons (e.g., 1304A, B) correspond to the transparent material (e.g., comprised of acrylic). Although some of the examples refer to pillars containing the florescent material, other embedded structures may be used as well. For example, the luminescent material might take the form of embedded helices or spirals within a transparent matrix. Alternatively, or additionally, the luminescent and transparent components may be reversed: embedding the luminescent material into the matrix (e.g., made of acrylic 906 or other host material(s) or even comprising of a glass ceramic of the luminescent material itself), enabling the transparent portion to consist of any transparent material or fluid (e.g., air, water, or a high-index oil).

Although some of the examples refer to the PersL concentrator being used to augment light for photosynthesis, the PersL concentrator may be used in other applications. For example, the PersL concentrator may be used to provide extra bright and/or long-lasting glow-in-the-dark materials. To illustrate further, strips of the PersL concentrator may be used for emergency lighting on a plane. By way of another example, the PersL concentrator may be used to provide a lamp that provides low-level evening lighting in areas without electricity.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A passive lighting system configured to redistribute sunlight to facilitate photosynthesis, wherein the passive lighting system comprises a luminescent material to redistribute photons spectrally and/or temporally.

Example 2: The passive lighting system of example 1, wherein the passive lighting system further comprises a concentrator, wherein the concentrator includes a body portion that is transparent to light of one or more wavelengths and further includes one or more embedded structures formed within the body portion, wherein the one or more embedded structure are comprised of the luminescent material.

Example 3. The passive lighting system of any of examples 1-2, wherein the one or more embedded structures comprise one or more pillars formed within the body portion.

Example 4. The passive lighting system of any of examples 1-3, wherein the one or more pillars form a matrix having a spacing between pairs of pillars between 0.8 mm and 1.5 mm apart.

Example 5. The passive lighting system of any of examples 1-4, wherein the concentrator is configured with a height between 5 and 20 mm.

Example 6. The passive lighting system of any of examples 1-5, wherein the one or more pillars are charged during a light phase based at least in part by light traversing the body portion of the concentrator.

Example 7. The passive lighting system of any of examples 1-6, wherein the concentrator is formed into a sheet to enable suspension over, and/or under, one or more plants to enable an emission of photoluminescent photons towards a top or bottom surface of the one or more plants.

Example 8. The passive lighting system of any of examples 1-7, wherein the luminescent material comprises a persistent luminescent (PersL) material.

Example 9. The passive lighting system of any of examples 1-8, wherein the persistent luminescent material comprises $SrAl_2O_4$:Eu,Dy.

Example 10. The passive lighting system of any of examples 1-9, wherein the body portion is composed of acrylic.

Example 11. A concentrator comprising: a body comprising a body material configured to allow light to pass through the body; and a plurality of channels extending through the body, the plurality of channels comprising a luminescent material; wherein the light passing through the body is configured to charge the luminescent material, the charged luminescent material configured to provide additional light.

Example 12. The concentrator of example 11, wherein the concentrator is configured to facilitate photosynthesis in one or more plants, and wherein the charged luminescent material is configured to provide additional light to facilitate the photosynthesis in the one or more plants.

Example 13. The concentrator of any of examples 11-12, wherein the body further comprises a body portion positioned between adjacent channels of the plurality of channels, and wherein the light is configured to pass from the body portion to the luminescent material to charge the luminescent material.

Example 14. The concentrator of any of examples 11-13, wherein the body comprises a first side and a second side opposite the first side, and wherein the body portion is positioned between the first side and the second side.

Example 15. The concentrator of any of examples 11-14, wherein the plurality of channels extends between the first side and the second side, and wherein each channel of the plurality of channels comprises: a first end; a second end; and a lateral portion extending between the first end and the second end; wherein the light is configured to pass from the body portion to the luminescent material through the lateral portion.

Example 16. The concentrator of any of examples 11-15, wherein the first end is positioned at the first side, and the second end is positioned at the second side.

Example 15. The concentrator of any of examples 11-16, wherein the first end is positioned inset from the first side, and the second end is positioned inset from the second side.

Example 16. The concentrator of any of examples 11-15, wherein the plurality of channels are defined by the luminescent material embedded in the body.

Example 17. The concentrator of any of examples 11-16 wherein the body material comprises acrylic.

Example 18. The concentrator of any of examples 11-17, wherein the body material is clear to allow the light to pass through the body.

Example 19. The concentrator of any of examples 11-18, wherein the luminescent material comprises a persistent luminescent (PersL) material.

Example 20. The concentrator of any of examples 11-19, wherein the PersL material comprises $SrAl_2O_4$:Eu,Dy.

Example 21. The concentrator of any of examples 11-20, wherein the plurality of channels is arranged in a matrix formation, and wherein, in the matrix formation, each channel of the plurality of channels is equally spaced from an adjacent channel of the plurality of channels.

Example 22. The concentrator of any of examples 11-21, wherein the matrix formation comprises a plurality of rows, and wherein each row of the plurality of rows is positioned offset from an adjacent row.

Example 23. The concentrator of any of examples 11-22, wherein the plurality of channels is at least one of coated with the luminescent material, filled with the luminescent material, and formed of the luminescent material.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A light concentrator configured to redistribute sunlight into persistent luminescence to facilitate photosynthesis, comprising:

(a) a transparent body, wherein the transparent body is transparent to visible light, wherein the transparent body has a top surface and a bottom surface spaced from each other by a body thickness ranging up to 20 mm, wherein the transparent body has a plurality of continuous channels distributed over the transparent body, wherein the plurality of continuous channels run through the transparent body from the top surface to the bottom surface, and wherein the plurality of continuous channels have defined inside surfaces from the top surface to the bottom surface; and (b) a $SrAl_2O_4$:Eu,Dy coating coated the inside surfaces of the plurality of continuous channels, wherein sunlight, coming in at the top surface of the transparent body, both scatters off the $SrAl_2O_4$:Eu,Dy coating at the inner surfaces and is absorbed and reemitted via persistent luminescence by the $SrAl_2O_4$:Eu,Dy, all while passing through the transparent body, and outputs the persistent luminescence at the bottom surface of the transparent body.

2. The light concentrator as set forth in claim 1, wherein the transparent body is composed of acrylic.

* * * * *